March 5, 1968 R. B. ENGDAHL ET AL 3,371,629
MOBILE INCINERATOR
Filed Nov. 18, 1964 8 Sheets-Sheet 1

RICHARD B. ENGDAHL
HERBERT R. HAZARD
GLEN M. HEIN
INVENTORS

BY Gray, Mase, and
Dunson, Attorneys

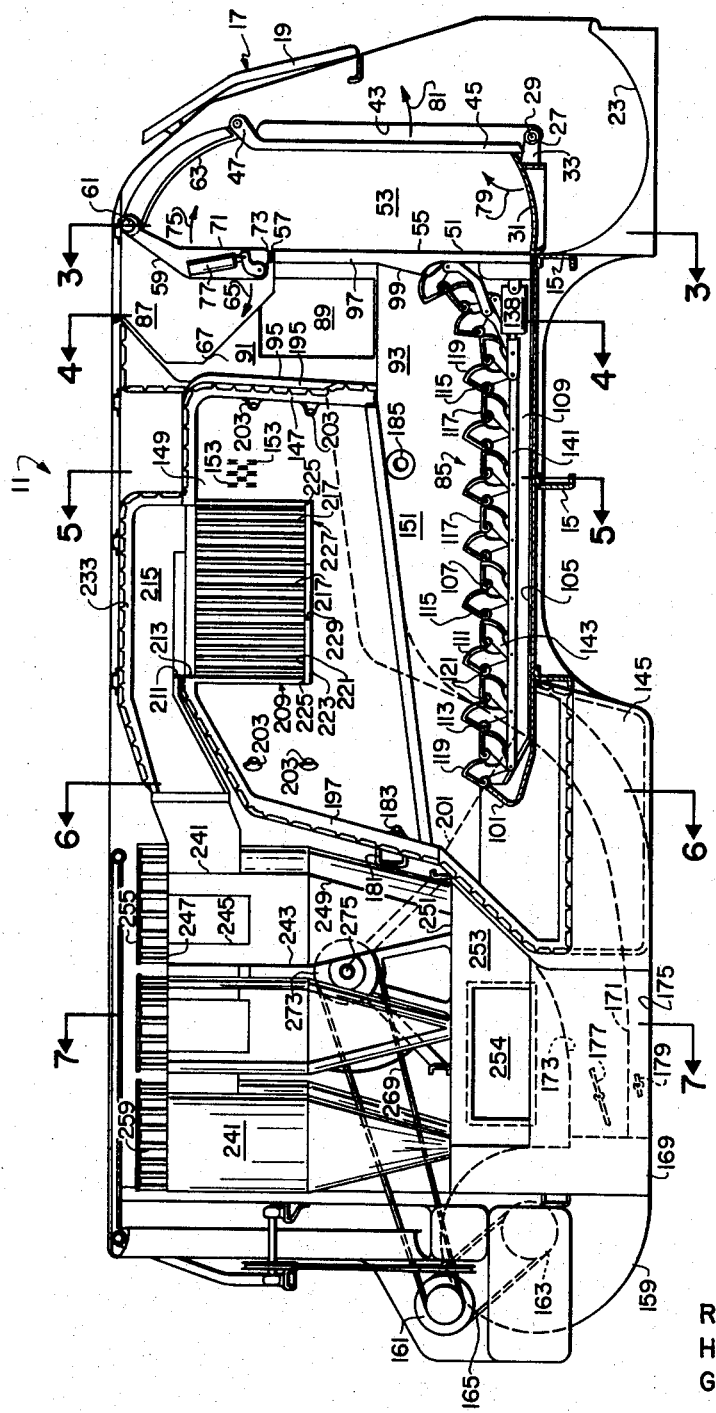

RICHARD B. ENGDAHL
HERBERT R. HAZARD
GLEN M. HEIN
INVENTORS

BY Gray, Mase, and
Dunson, Attorneys

March 5, 1968   R. B. ENGDAHL ET AL   3,371,629
MOBILE INCINERATOR

Filed Nov. 18, 1964   8 Sheets-Sheet 4

RICHARD B. ENGDAHL
HERBERT R. HAZARD
GLEN M. HEIN
    INVENTORS

BY Gray, Mase, and
Dunson, Attorneys

RICHARD B. ENGDAHL
HERBERT R. HAZARD
GLEN M. HEIN
INVENTORS

BY Gray, Mose, and
Dunson, Attorneys

March 5, 1968 R. B. ENGDAHL ET AL 3,371,629
MOBILE INCINERATOR
Filed Nov. 18, 1964 8 Sheets-Sheet 6

RICHARD B. ENGDAHL
HERBERT R. HAZARD
GLEN M. HEIN
    *INVENTORS*

BY *Gray, Mase, and Dunson, Attorneys*

RICHARD B. ENGDAHL
HERBERT R. HAZARD
GLEN M. HEIN
INVENTORS

BY Gray, Mase, and
Dunson, Attorneys

United States Patent Office 3,371,629
Patented Mar. 5, 1968

3,371,629
MOBILE INCINERATOR
Richard B. Engdahl, Herbert R. Hazard, and Glen M. Hein, Columbus, Ohio, assignors to Battelle Memorial Institute, Columbus, Ohio, a corporation of Ohio
Filed Nov. 18, 1964, Ser. No. 412,211
3 Claims. (Cl. 110—8)

This invention relates to apparatus for the collection and disposal of refuse. More particularly, it concerns a mobile incinerator that receives and incinerates refuse as the apparatus moves along the road or street.

The collection and disposal of municipal refuse is becoming more of a problem each year. Of the major methods of refuse disposal, landfill is by far the most economical and will probably be used as long as the sites are available. However, these sites are rapidly becoming less available, and less accessible from the collection area. Although centralized incineration is being used more and more, this system involves high initial investment, high operating costs, and long-term planning. Home incineration is not expected to keep up with the increasing needs, and the cost to the home owners for an approved incinerator is expected to prevent mass adoption. Composting and other forms of disposal are not competitive with the other methods mentioned. The composting process is slow, and is not economical if appreciable amounts of transportation are involved.

One promising method of reducing the problem mentioned above is the use of a mobile incinerator. Because of the change in living habits over the years, a much higher percentage of the refuse is now burnable. For example, many more homes are now equipped with sink garbage-disposal units and the trend of modern food preservation is from cans to paper cartons, due to the rise in popularity of both frozen and dehydrated foods. In addition, the increase in inhabited areas has made the transportation of refuse to a central area increasingly time-consuming.

The conventional garbage collection truck can be loaded with about 18 to 25 cubic yards of refuse. This amounts to about one-half day's collection, then the trucks must travel to a central incinerator or dumping ground. The normal-sized apparatus of this invention burns about 3500 pounds of refuse per hour and handles about 50 cubic yards of refuse before unloading is required. This means that the collection unit can stay on its route the entire day, rather than making two or more time-consuming "dumping" trips.

The combustion temperature for the incineration of refuse must necessarily be relatively high in order to burn moist or wet refuse and to prevent odors from the burning refuse. The high temperatures cause numerous problems in the construction of an apparatus that will withstand the heat and still have a satisfactory service life. Conventional incinerators are constructed of heavy refractory materials. The weight of such temperature-resistant materials makes them impractical for use in a mobile incinerator. The combustion chamber of the mobile incinerator of this invention is constructed with refractory material surrounding only the area of the grate where ultrahigh temperatures are maintained to ensure complete incineration of the refuse. The major portion of the combustion chamber is constructed of metal sheets that are protected from the high combustion temperatures by a film of cooling air that is in rapid motion on the inside of the combustion chamber walls. The incinerator is constructed so that other portions subjected to high temperatures, such as flue, grate, flue grid, etc., are cooled by moving air.

The mobile incinerator of this invention includes a number of major components and auxiliary equipment to supply power etc., to the major components. Each major component preferably occupies the full width of the vehicle. The major components from the back to the front of the vehicle in their preferred arrangement are (1) the charging mechanism, (2) the combustion chamber, (3) residue storage, (4) the fly-ash collector, and (5) the auxiliary equipment, such as fuel tanks and power mechanism. Preferably, the size of the unit is about 29 feet long, 8 feet wide, and 11 feet high.

In ordinary operation, the mobile incinerator of this invention moves or is towed along the street and refuse is loaded into a hopper at the rear. The incineration rate of the refuse is equal to, or faster than, the collecting rate of a conventional packer truck. Means are provided to remove the refuse from the hopper and elevate the refuse to a refuse storage chamber. At the bottom of the refuse storage chamber, a grate moves the refuse into the combustion chamber where at least one oil burner is provided to start incineration and is also operated any time that it is necessary to increase the combustion temperature within the chamber. Combustion air is introduced tangentially at high velocity to provide the rotating swirl and turbulence needed for high burning capacity. Unburnable refuse eventually drops off the grate into a residue storage compartment below the combustion chamber and grate level. A grid cage is provided covering the flue opening and the cage extends into the combustion chamber to prevent large unburned particles of refuse from being blown into the flue by the high-velocity air. The combustion gases, containing fly ash, pass through the flue to a plurality of cyclone-type dust collectors in which the gas and ash are separated. The ash drops from the bottom of the cyclones to a fly-ash storage chamber. The combustion gases are passed from the top of the cyclones, being deflected horizontally by deflection plates to the tops of the cyclones. Large amounts of cooling air are directed over the cyclones by one or more blowers. The cooling air eventually passes upward to mix with the combustion gases as they emerge from the cyclones and thereby greatly reduces the temperature of the gases being discharged to the atmosphere.

One of the over-all advantages of this invention is the reduction in weight and volume of refuse as it is being collected so that subsequent disposal problems of the residue are minimized. Another advantage is that the invention at least doubles the amount of refuse that can be collected by conventional collection units of comparable sizes and weight thereby eliminating numerous trips to and from the dumping areas.

Another advantage of the mobile incinerator of this invention is that the refuse is incinerated at a high temperature, and flue gases are maintained at a high temperature (until subsequently cooled), thereby eliminating objectionable smoke and odors.

Still another advantage of the invention is that the materials used for construction, and the particular construction that is so arranged to keep the materials cool, produce a weight comparable to conventional apparatus for refuse collection and the result is a practical, useable mobile incinerator.

Still another advantage of the invention is a preferred grate construction that agitates and breaks up the refuse as it moves the refuse through the combustion chamber, ensuring complete and rapid incineration.

Still another advantage of the invention is that the flue gases are cooled to such an extent, before they are discharged from the incinerator, that the incinerator can travel streets with overhanging trees and foliage without damaging them.

Still another advantage of the invention is that easy, safe, rear loading is accomplished with a minimum amount of down time per intake cycle by the incinerator.

Still another advantage of the invention is that, although the temperatures for burning the refuse are relatively high, the exterior of the mobile incinerator is cool enough to touch without individuals being burned from contact with the exterior.

Still other advantages will be apparent from the description that follows, the drawings, and the claims herein.

In the drawings:

FIG. 2 is a longitudinal sectional view of the mobile incinerator;

Figure 1:
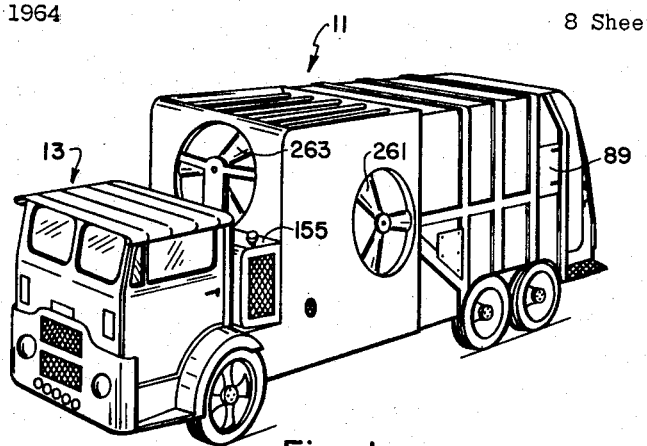
FIG. 1 is a perspective view of the exterior of the mobile incinerator as it would appear mounted on the chassis of a truck.

Referring to FIG. 1 the mobile incinerator 11 is shown mounted on a truck 13. The incinerator 11 could, however, be mounted on a trailer frame suitable for towing.

The longitudinal cross-sectional view shown in FIG. 2 shows the major components of the incinerator 11 with only a minimum of the basic mounting frame 15, which in this case is the chassis of the truck 13, shown.

Figure 3:
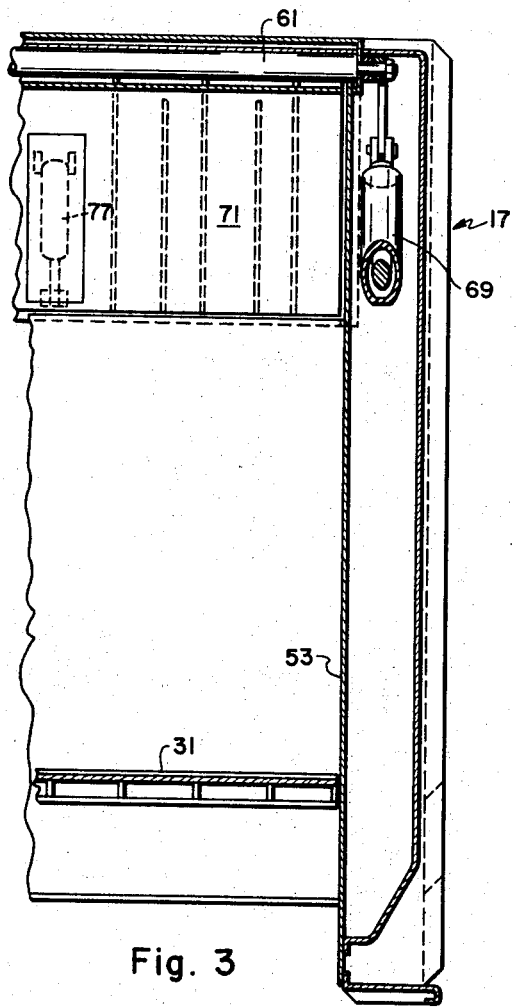
FIG. 3 is a cross-sectional view through the charging mechanism taken along the lines 3—3 of FIG. 2.
Figure 9:
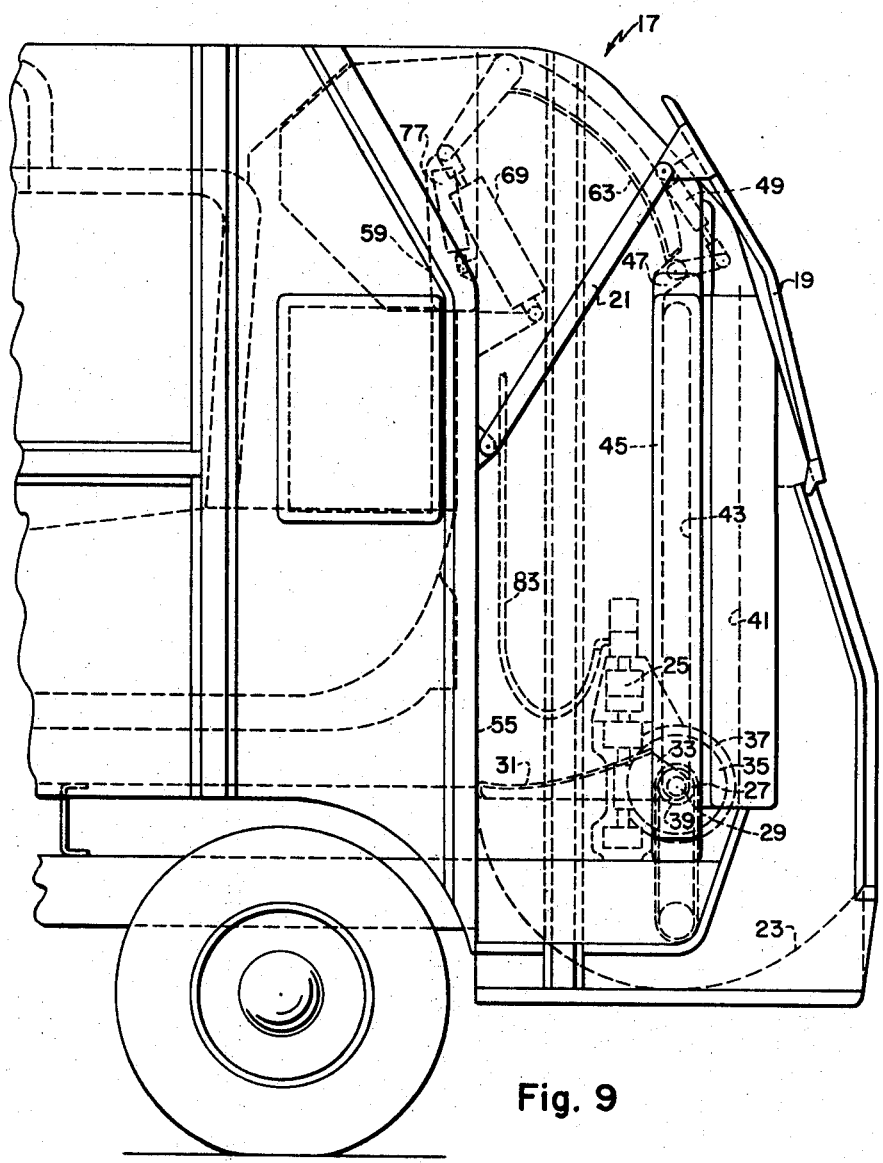
FIG. 9 is an elevational view of a portion of the incinerator in the area of the charging mechanism.

FIGS. 2, 3, and 9 show the charging mechanism 17. A door 19 pivots on mounting arms 21—21 (shown in FIG. 9) to cover and uncover a hopper 23 suspended from the rear of the incinerator 11 for receiving refuse. A power source, preferably a hydraulic motor 25 (shown in FIG. 9), is connected to a hollow shaft 27 (shown in FIG. 2). A second power source (not shown, but the same as the hydraulic motor 25) is mounted on the opposite side of the charging mechanism 17 and is connected to a solid shaft 29 that is positioned within hollow shaft 27. A rotary lift panel 31 is attached by means of a lug 33 to the hollow shaft 27. The solid shaft 29 is provided, at each end, with wheels 35—35, each wheel 35 having a gear surface 37 and a hub 39. The gear surface 37 engages a rack 41 and the hub 39 engages a track 43 (see FIG. 9). A retaining panel 45 is mounted above the rotary lift panel 31 (in the position that the lift panel 31 occupies in the figures) and is pivotally mounted at its upper end 47. The retaining panel 45 is pivoted toward the rear of the incinerator 11 at appropriate intervals by a power source, preferably a hydraulic cylinder 49 (shown in FIG. 9). The retaining panel 45, when in the position shown in FIG. 2, comprises one wall of a vertical passage 51 with two of the other walls being side panels 53—53 (FIGS. 2 and 3). The hopper 23 is extended vertically as a panel 55 to comprise the fourth wall of the passage 51. At the top of the passage 51 and sealing against the top edge 57 of panel 55, is a door 59. The door 59 is pivotally mounted on an axle 61 that is mounted in the side panels 53—53. A pusher panel 63 is fixedly attached to the door 59. The door 59, shown here in the closed position, may be pivoted in the direction of the arrow 65 (FIG. 2) to open into a refuse storage chamber 67. The door 59 is activated by power sources, preferably hydraulic cylinders 69—69, positioned on each side of the charging mechanism 17. A packer panel 71 is pivotally mounted at 73 on the door 59 and can be pivoted in the direction of the arrow 75 (FIG. 2) at the appropriate time by power means such as hydraulic cylinder 77 (FIGS. 2 and 9).

The operation of the charging mechanism 17 begins when a suitable amount of refuse has been deposited in the hopper 23. A switch or push button on the exterior of the incinerator 11 (or other suitable control switch) activates a sequence that is entirely automatic. The rotary lift panel 31 begins to rotate with the hollow shaft 27 in the direction of the arrow 79 and at about the same time the retaining panel 45 is pivoted rearward in the direction of the arrow 81 so that it does not interfere with the rotation of lift panel 31. The rotation of the lift panel 31 scoops the refuse from the hopper 23 and, after the lift panel 31 has cleared the retainer panel 45, the panel 45 swings back to its original position. After one complete revolution of the lift panel 31, the refuse is transferred to the passage 51 and stacked on top of the lift panel 31. At this time, with the lift panel 31 locked horizontally by suitable means, solid shaft 29 begins to rotate so that the wheels 35, through their gear surface (37) engagement with rack 41, raise the lift panel along with the refuse to the top of the passage 51. The upper surface of the lift panel 31 comes to rest at the level of the upper end 57 of panel 55. During operation of the incinerator 11 there will be air pressure (preferably about 5 inches of water pressure) in the refuse storage chamber 67 so that the lift panel 31 provides an effective air block and the refuse will not be blown back down the passage 51 when the door 59 is opened. With the lift panel 31 in position at the top of the passage 51, the door 59 starts to swing open in the direction of the arrow 65. Since pusher panel 63 is attached to the door 59, the pusher panel 63 moves simultaneously with the door 59 and pushes the refuse into the refuse storage chamber 67. When the door 59 is fully opened and the pusher panel 63 has traversed completely over the lift panel 31, the packer panel 71 pivots in the direction of the arrow 75 (note that it is now inside the refuse storage chamber 67) and pushes or packs down any refuse that may protrude above the level of the top edge 57 of panel 55. Thus, the door 59 can swing shut without pushing refuse back onto the lift panel 31. The door 59 then closes and the lift panel 31 is returned to its original position until the sequence is restarted again. Rotation of the lift panel 31 to scoop out the hopper 23 ordinarily requires about four seconds and the hopper 23 can be receiving refuse while the lift panel 31 is traversing passage 51. When hydraulic motors, such as hydraulic motors 25, are used as the power sources for the lift panel 31, the pressurized hydraulic fluid is supplied through flexible members such as hose 83 (FIG. 9).

Figure 4:
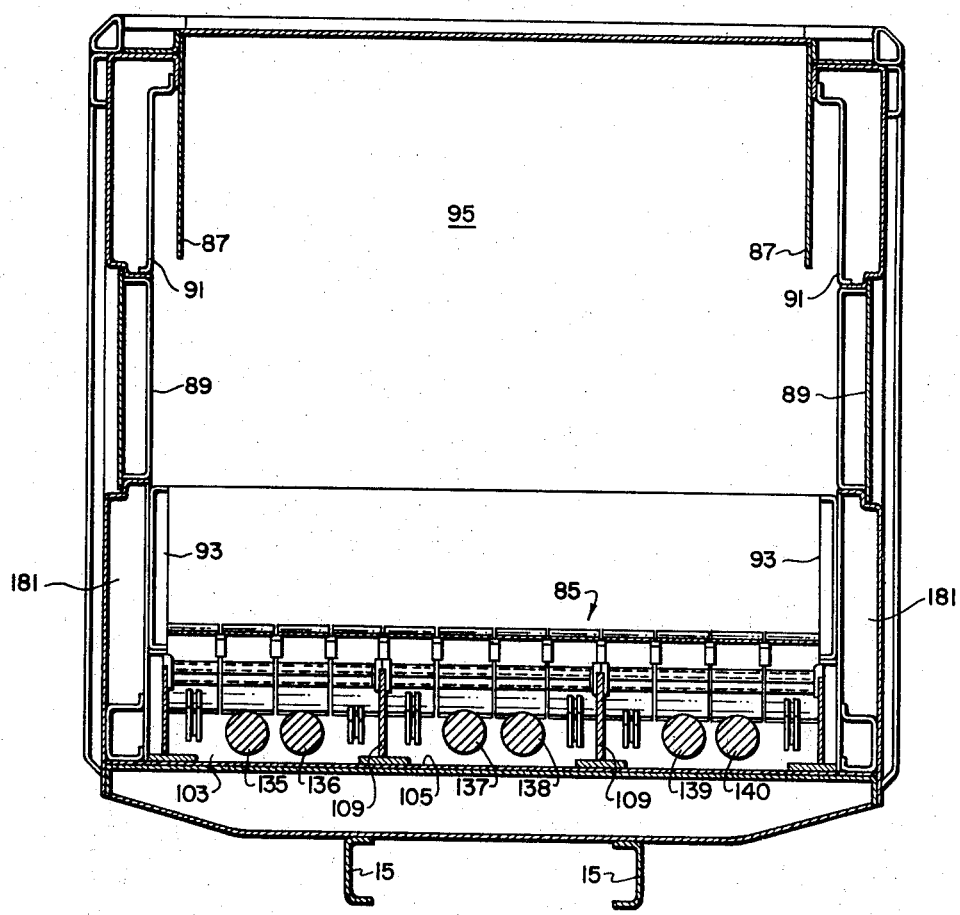
FIG. 4 is a cross-sectional view through the grate and refuse storage chamber taken along the lines 4—4 of FIG. 2.

FIG. 4 is a section through a portion of the grate 85 and the refuse storage chamber 67. Some refuse may accumulate in the refuse storage chamber 67 until it can be moved along the grate 85. Two guide panels 87—87 are provided, one on each side of the refuse storage chamber 67, to aid in preventing refuse from becoming jammed in the refuse storage chamber 67. The guide panels 87—87 extend part way toward the bottom of the chamber 67 so that the bottom portion of chamber 67 has a greater width than the top portion. Access doors 89—89 are provided on each sidewall 91—91 of the chamber 67 to allow access for repair or any other purposes that might arise. A refractory material 93 lines the entire grate area and a portion of the refractory material 93 is shown in the cross section of FIG. 4 just below the access doors 89—89. The refuse storage chamber 67 is defined by a forward wall 95, the sidewalls 91 (including access doors 89—89 and, at the bottom portion, refractory material 93), and a rear wall 97. The rear wall 97 extends from the door 59 to the grate 85 and has a slanted portion 99 that deflects the refuse onto the grate 85.

The preferred grate arrangement (shown in its entire length in FIG. 2 and in cross section in FIGS. 4 and 5) is an oscillating or rocking-step grate 85. The rocking-step grate 85 has some significant advantages over a traveling-belt-type grate. First, the rocking type provides agitation or tumbling motion to loosen the refuse for better penetration of air, and second, the rocking type can provide decreased travel speed over its length for increased residence time of the refuse since the refuse tends to thin out as it moves toward the discharge end 101 of the grate 85. In addition, the rocking-type grate, having a plurality of sections, allows air to pass upward through the grate from an undergrate air plenum 103 provided below the grate 85 and can be constructed with less heighth than a belt-type grate.

The members of the grate 85 are mounted from the floor 105 of the undergrate plenum 103 which is in turn attached to the frame 15. A plurality of cross rods 107—107 are supported by a plurality of longitudinal members 109—109. A plurality of grate members 111—111 are pivotally mounted on the rods 107—107. In the longitudinal section of FIG. 2 the surface 113, that contacts the refuse, will be seen alternating in the position of having the surface 113 horizontal and tilted. The tilted grate members 111—111 are arranged in cross rows designated by the number 115 and the horizontal grate members 111—111 are arranged in rows designated by the number 117 (the rows designated 117 are all horizontal except at the rearward position of the grate 85 where they are also tilted). The rearward portion of each grate member 111 has an arcuate surface 119 so that as each grate member 111 is pivoted upon the rod 107 each surface 119 is maintained adjacent to the forward portion 121 of the next rearward grate member 111. The portion 121 of each grate member 111 is curved to fit around a cross rod 107 and serves as a pivotal mounting point for each grate member 111.

Figure 5:
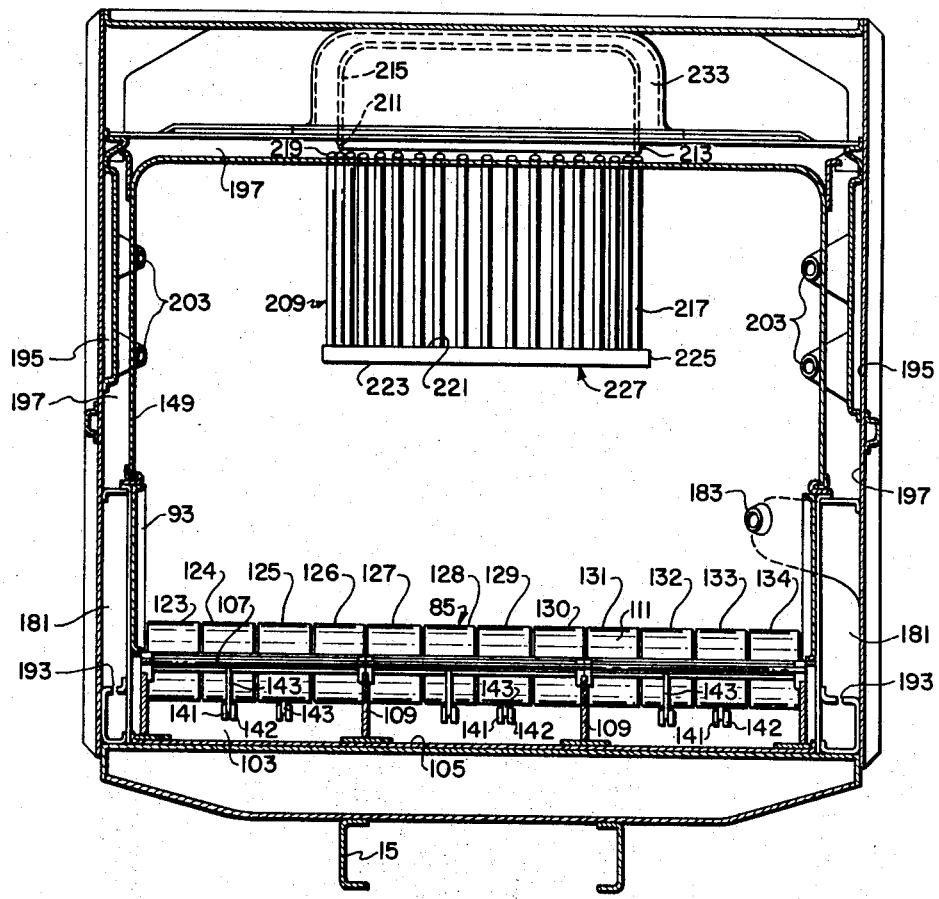
FIG. 5 is a cross-sectional view through the grate and combustion chamber taken along the lines 5—5 of FIG. 2.
Figure 6:
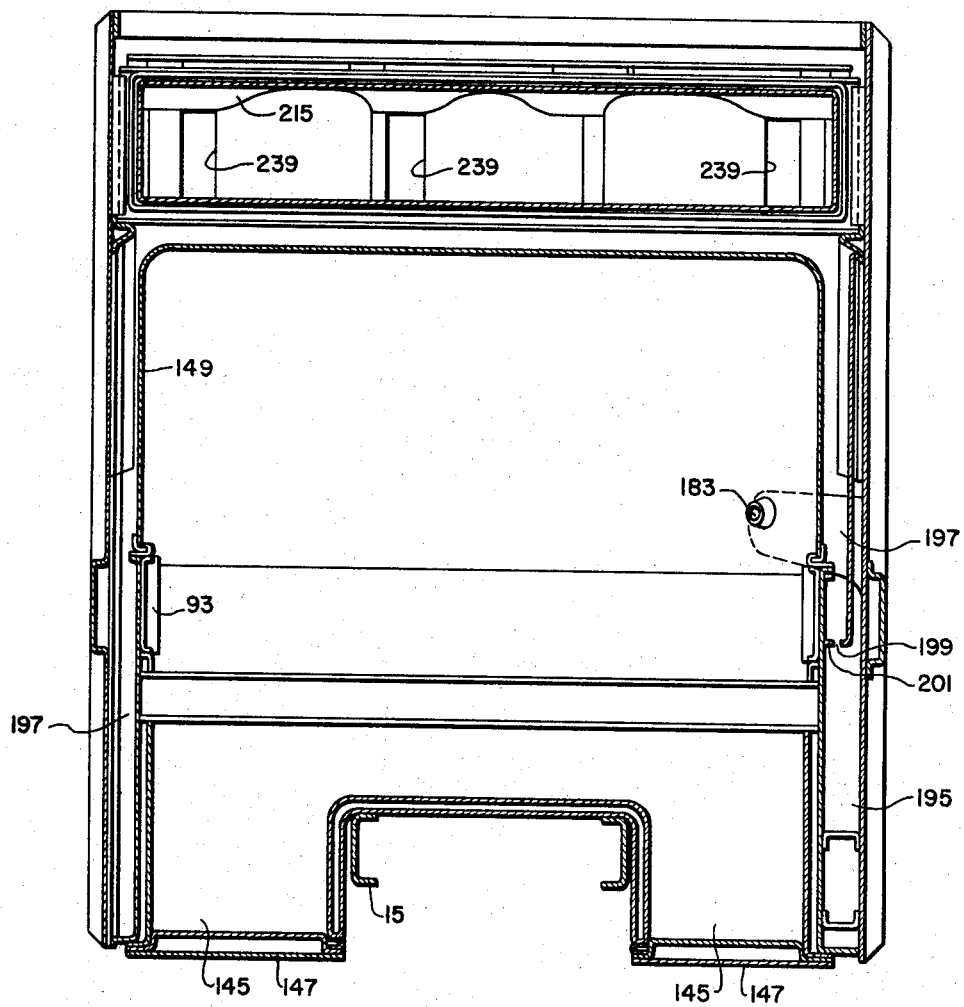
FIG. 6 is a cross-sectional view through the combustion chamber and flue taken along the lines 6—6 of FIG. 2.

FIG. 5 shows a plurality of longitudinal rows of grate members 111—111. The rows are designated (from left to right as they appear in FIG. 5) as 123, 124, 125, 126, 127, 128, 129, 130, 131, 132, 133, and 134. FIG. 4 shows six power means such as hydraulic cylinders 135, 136, 137, 138, 139, and 140. Each hydraulic cylinder (135–140) reciprocates a pair of bars 141 and 142 beneath the grate members 111—111. Each of the grate members 111—111 of rows 124, 125, 128, 129, 132, and 133 are provided with an extension 143 that is connected to the bars 141-142 directly beneath the row. Hydraulic cylinder 135 activates a pair of bars 141 and 142 that in turn are connected to those grate member 111—111 that occupy positions in longitudinal row 124 and cross rows 115—115. Hydraulic cylinder 136 is similarly connected to grate members 111—111 that occupy positions in longitudinal row 125 and cross rows 117—117. The other hydraulic cylinders (137, 138, 139, and 140) are connected to rows of grate members 111—111 as follows: cylinder 137 to longitudinal row 128 and cross rows 115—115, cylinder 138 to longitudinal row 129 and cross rows 117—117, cylinder 139 to longitudinal row 132 and cross rows 115—115, and cylinder 140 to longitudinal row 133 and cross rows 117—117. The grate members 111—111 of the cross rows 115—115 and 117—117 are cross connected in longitudinal rows 123 through 126, 127 through 130, and 131 through 134 whereby the upper surfaces of the four cross-connected grate members 111—111 move like a single surface. When hydraulic cylinders 135, 137, and 139 move the bars 141—141 and 142—142 rearward, to the position shown in FIGS. 2 and 5, the grate members 111—111 of cross rows 115—115 are in the tilted position while cylinders 136, 138, and 140 are holding their associated bars 141—141 and 142—142 forward so that cross rows 117—117 are held in the horizontal position. After cylinders 135, 137, and 139 move to return the grate members 111—111 of cross rows 115—115 to the horizontal position, cylinders 136, 138, and 140 then cycle so that grate members 111—111 of rows 117—117 tilt and return to horizontal while cross rows 115—115 are stationary. Thus the alternate tilting action of cross rows of grate members 111—111 is such that refuse is continuously tumbled along from the storage chamber 67 toward the end 101 of the grate 85. The refuse that finally reaches the end 101 of grate 85 is unburnable and falls into a residue pocket 145 (FIGS. 2 and 6). The residue pocket 145 is provided with empty out doors 147—147.

At present, the burning of municipal refuse, to reduce its volume to dry, incombustible ash, takes place in large refractory incinerators which are heavy and, therefore, not suited for mobile use. In the mobile incinerator of this invention, burning of the refuse takes place within a combustion chamber 151, which includes the area lined by the refractory material 93 and a box-like chamber 149 (although other shapes are also suitable). The chamber 149 is preferably made of sheet metal (about 11-gage stainless steel) and provides a combustion chamber that is much lighter in weight than conventional combustion chambers constructed entirely of refractory materials. The metal chamber 149 is best seen in FIGS. 2, 5, and 6. The thin walled chamber 149 is protected from the high combustion temperature by "film cooling" which is provided by many thin streams of air that enter through a plurality of thin slots 153—153. The slots 153—153 are constructed so that a thin film of air is maintained parallel and close to the inner surface of the chamber 149 minimizing convective heat transfer from hot, burning gas to the wall.

Figure 7:
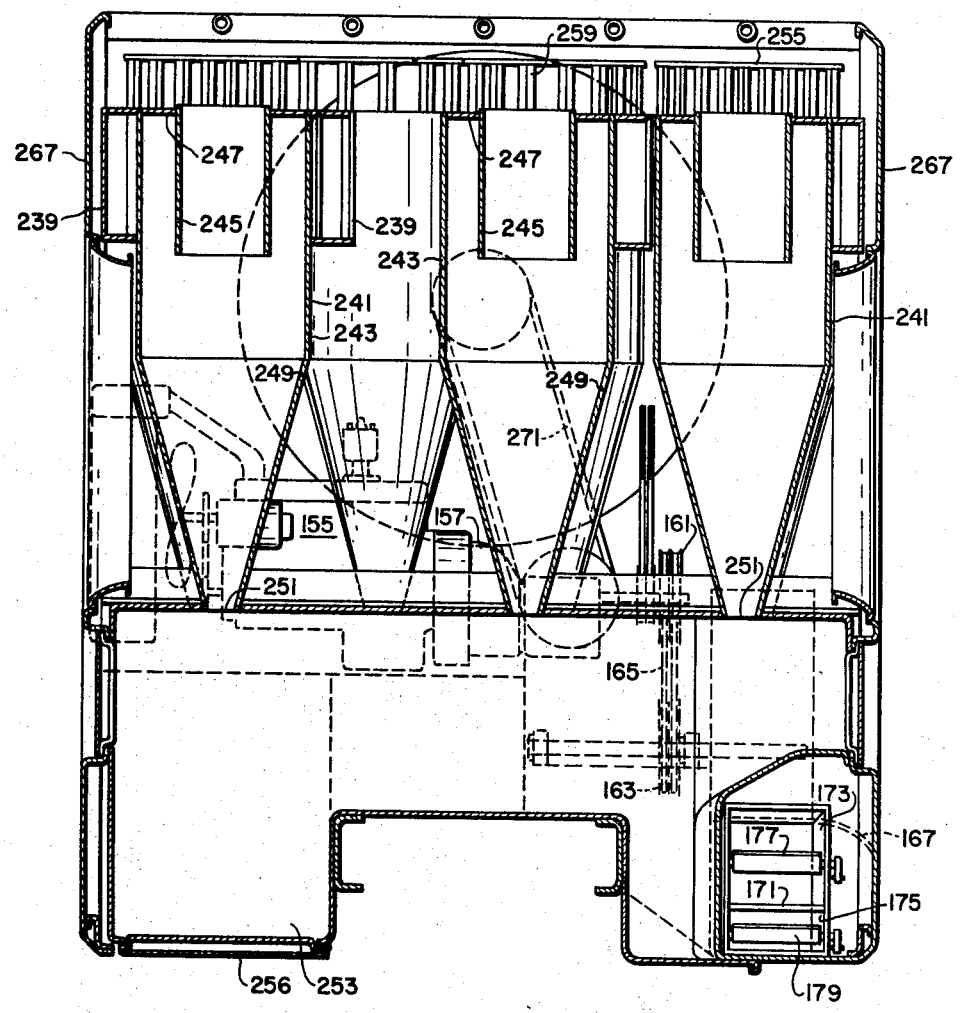
FIG. 7 is a cross-sectional view through the cyclones and fly-ash storage chamber taken along the lines 7—7 of FIG. 2.

One way to understand both the method and apparatus for burning the refuse and for cooling various portions of the mobile incinerator 11 is to follow the flow of combustion air from the supply source to discharge as hot exhaust gas. A power source, such as diesel or gasoline engine 155 (FIGS. 7 and 8), preferably mounted on the front of the mobile incinerator 11 is connected to a transmission 157 (FIG. 7) that drives a centrifugal blower 159 (FIG. 2) by suitable means such as pulleys 161, 163, and a belt 165. The air is received into the blower 159 through a blower entrance 167 and discharged under pressure into a duct 169. After entering duct 169, the air is almost immediately divided into two parts by a partition 171. Air entering upper duct 173 is designated secondary air and air entering lower duct 175 is designated primary air. (The preferred values of various air pressures are stated herein for purposes of comparison and in order that the function of various chambers, plenums, air jets, louvers, etc. will be better understood. It should be noted, however, that other pressures also allow efficient operation of the incinerator 11.) Air enters the primary air duct 175 and secondary air duct 173 normally at about 16 inches of water pressure. A damper 177 in duct 173 and a damper 179 in duct 175 may be adjusted together or independently depending upon the requirements of combustion and temperature. Actual controls are not specifically shown herein, but thermocouples placed at selected positions throughout the combustion air and combustion gas systems are used to sense the temperature and signal various motivating centers to control such devices as the dampers 177 and 179.

Figure 8:
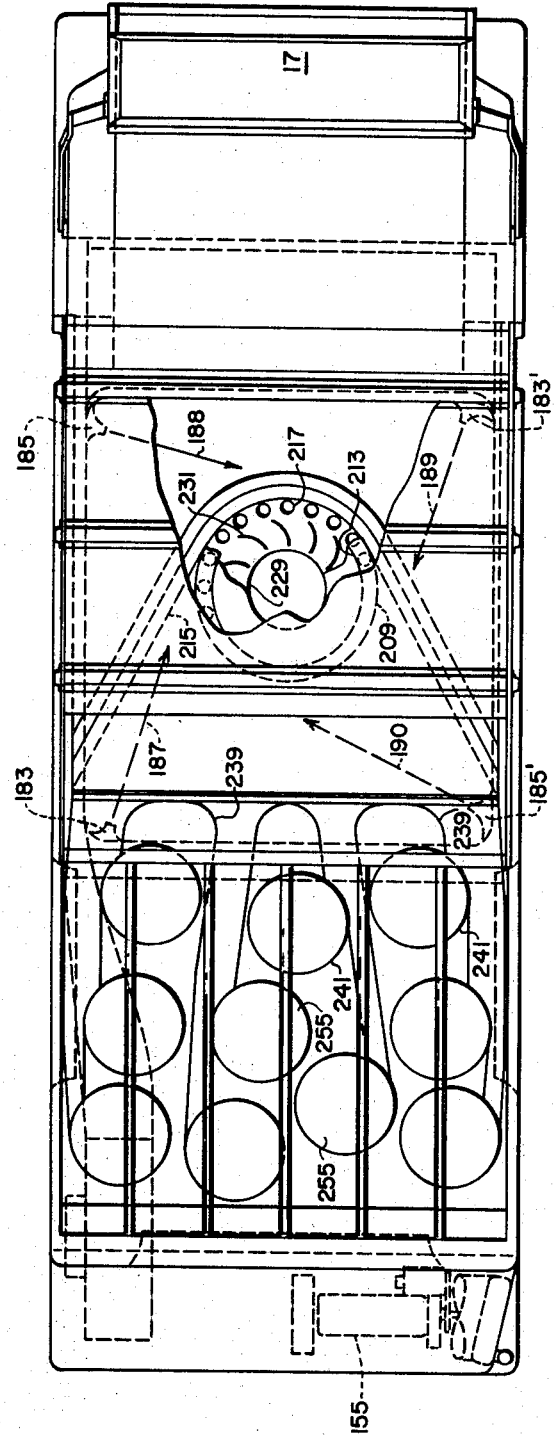
FIG. 8 is a plan view of the mobile incinerator.

The primary air enters the duct 175 (FIGS. 2 and 7) at a pressure of about 16 inches of water and is supplied to a plenum 181 (FIGS. 4 and 5) that encircled both the grate 85 and the area immediately above the grate 85. Passage of the air through duct 175 causes some pressure drop so that the air arriving at plenum 181 is at a pressure of about 15 inches of water. The plenum 181 supplies air to four air nozzles, one nozzle being located at each corner of the combustion chamber 151. An air nozzle 183 is shown in FIGS. 2, 5, 6, and 8 and another air nozzle 185 is shown in FIGS. 2 and 8 positioned in the area of the refractory material 93. The air jet or nozzle 185 is also provided with an oil supply line and ignition (not shown). Another air nozzle 185′ (FIG. 8) positioned diagonally opposite nozzle 185 is also provided with an oil supply line, but need not have an igniter. The oil-supplied air nozzles 185 and 185′ function as oil burners during initial start-up. Once the combustion temperature reaches a sufficient level (preferably about 1300° F.), the oil supply is turned off. If a large amount of wet refuse is collected and the flue gas temperature begins to drop, oil is again supplied to nozzles 185 and 185′ to maintain proper combustion temperature. The fourth air nozzle 183′ is positioned diagonally opposite the air nozzle 183 (FIG. 8). The air nozzles 183, 183′, 185 and 185′ are positioned to direct a high-velocity stream of air tangentially into the combustion chamber in the direction of the arrows 187, 188, 189, and 190 (shown in FIG. 8). The plenum 103 beneath the grate 85, supplies undergrate air that passes upward between the grate members 111—111 and into combustion chamber 151. The air pressure in plenum 181 (about 15 inches of water) is throttled by suitable means such as orifices 193—193 (FIG. 5) before it enters plenum 103 where the air pressure is maintained at about 6 inches of water.

The secondary air enters the duct 173 at a pressure of about 16 inches of water and is divided into two parts. One part enters an outer plenum 195 (FIGS. 5 and 6) and is maintained at a pressure of about 15 inches of water. The other part enters an inner plenum 197 (FIGS. 5 and 6) through a series of orifices 199—199 positioned in a plate 201 (FIGS. 2 and 6). The orifices 199—199 reduce the pressure of the air from 15 inches to 7 inches of water in the plenum 197. The air from plenum 195 supplies air to four pairs of air nozzles 203—203 of which three pairs are shown in FIGS. 2 and 5. One pair of air nozzles 203—203 is positioned in each corner of the chamber 149. The air is directed from the nozzles 203—203 into the chamber 149 in the direction of the arrows 187, 188, 189, and 190. The primary air from nozzles 183, 183′, 185 and 185′ and the secondary air from nozzles 203—203 enters the combustion chamber 151 rapidly and is directed (by the walls and orientation of the nozzles) into a swirl or circle inside the chamber 151. With the air nozzles (183, 183′, 185, 185′, and 203—203) positioned and directed as shown in the drawings, the air will be moving clockwise within the combustion chamber 151 as the chamber 151 is viewed from the top (FIG. 8). The vortex of air created in the combustion chamber 151 helps to prevent large pieces of lightweight unburned refuse from escaping before being burned, largely by centrifugal force. The flue gas is taken off at about the top center of the combustion chamber 151 so that even though large amounts of air may pass through the chamber 151, the heavier unburned pieces of refuse are swept into the rapidly moving rotating air stream and prevented from escaping from the flue gases due to their velocity.

The secondary air in the inner plenum 197 (at a pressure of about 7 inches of water) enters the combustion chamber 151 through a plurality of closely spaced louvers or slots 153—153 in the walls of the chamber 149. The slots 153—153 are constructed so that air enters the combustion chamber 151 in the same circular clockwise pattern established by the air nozzles 183, 183′, 185, 185′ and 203—203. The secondary air passing through the plenum 197 and slots 153—153 provides an air curtain or air film on the inner surfaces of the walls of chamber 149. In the preferred construction of the chamber 149, the walls are stainless steel about ⅛-inch thick. The louvers 153—153 are about 2 inches long and have a gap about ¹⁄₃₂-inch wide. There are about 12 louvers 153—153 per square foot of wall surface. The louvers 153—153 are arranged in staggered rows so that the walls of chamber 149 do not develop hot spots.

The plenum 197 also communicates with a central gas offtake grid 209 that surrounds the central flue opening 211. A collar 213 extends from the flue 215 and is surrounded by a plurality of tubes 217—217. Each tube 217 has one end 219 cut at an angle and extending into plenum 197 (FIG. 5). Air enters the tube ends 219—219 and passes downward to the opposite end where it is discharged into a space between two annular plates 221 and 223 enclosed at their outer periphery by a wall 225. The annular plates 221, 223 and wall 225 form an annular chamber 227 having a central opening 229. A plurality of curved vanes 231—231 (FIG. 8) are positioned between the two discs 221 and 223. When the air is discharged from the tubes 217—217 into the outer periphery of chamber 227 and moves toward the central opening 229, the vanes 231—231 impart a swirl or motion to the air that is compatible with the air already in the chamber 151, that is, when viewed from above (FIG. 8) the air has a clockwise motion. The air passing through the gas offtake grid 209 not only cools the grid 209, but is also preheated and is directed downward with a swirling motion onto the refuse in the central portion of the grate 85. The flue gases and fly ash must pass between the tubes 217—217 to reach the flue opening 211. The ring of tubes 217—217 or cage prevents large pieces of lightweight unburned refuse or unburnable refuse from being entrained in the flue gas.

The secondary air in plenum 195 is throttled by suitable means (not shown) to a pressure of 7 inches of water and passes to a plenum 233 surrounding the flue 215. The wall of the flue 215 is also provided with louvers 153—153. The flue gas will usually be at a temperature up to 1700° F. and the walls of the flue 215 require cooling. The outer walls of the combustion chamber 151 and flue 215 are further protected from high temperatures by a reflective or radiation shield 235. The shield 235 is a thin sheet of metal with V channels 237—237 formed at intervals to space the shield 235 from the walls allowing moving air in plenums 197 and 233 to pass between the shield 235 and the wall to which the shield 235 is attached.

The flue gas passes from the flue 215 into a plurality of passages 239—239 that communicate with a plurality of cyclone-type dust collectors 241—241. Each cyclone 241 has an outer cylindrical wall 243, an inner hollow cylinder 245 (open at both ends) that is attached to the outer cylinder at the top by means of an annular cap 247. The bottom of the outer cylinder 243 is attached to a tapered section 249 having an opening 251 that communicates with a fly-ash storage space 253. Flue gas, from a passage 239 enters the space between the inside of cylinder 243 and the outside of cylinder 245 and spins rapidly, spiraling downward, the fly ash being thrown against the walls by centrifugal force and dropping through the tapered section 249 to the fly ash storage space 253. The fly ash space 253 is provided with access or inspection doors 254—254 on each side and fly-ash dump doors 256—256 at the bottom. The flue gas leaves the cyclone 241 through the inside of cylinder 245. A circular or disc-like baffle 255 is positioned above the top opening 257 of each cyclone 241. The baffle 255 for each cyclone 241 is attached to the annular cap 247 by a plurality of V-shaped bars 259. The baffle 255 deflects the flue gases horizontally while the V-shaped bars 259—259 divide the exiting flue gas into a plurality of radial jets.

Three propeller fans 261, 263, and 265 are incorporated in the walls 267—267 of the cyclone housing. (Propeller fans 261 and 263 are shown in FIG. 1, but propeller fan 265 is not actually shown in any view.) They are operated by belt drives 269 and 271 from the auxiliary engine 155. Belt drive 269 drives propeller fans 261 and 265 by engagement with a pulley 273 fixed to an axle 275 that is common to both fans 261 and 265. The fans 261, 263, and 265 introduce a flow of cooling air into the space around the lower tapered cyclone sections 249—249. Most of the metal surfaces of the cyclone 241—241 are cooled to a temperature well below the flue gas temperature and the flue gas temperatures are also reduced somewhat before the flue gas is discharged from the cyclones 241—241. The air from fans 261, 263, and 265, after cooling the cyclones 241—241, mixes with the hot flue gas and temperature of the air and flue gas mix is below 250° F.

The mixing of flue gas and cooling air is greatly assisted by the baffles 255—255 and V-shaped bars 259—259.

It will be understood, of course, that, while the form of the invention herein shown and described constitutes the preferred embodiments of the invention, it is not intended herein to illustrate all of the possible equivalent forms or ramifications of the invention. It will also be understood that the words used are words of description rather than of limitation, and that various changes, such as changes in shape, relative size, and arrangement of parts may be substituted without departing from the spirit or scope of the invention herein disclosed.

What is claimed is:

1. A mobile apparatus for the collection and incineration of refuse comprising:
   (a) a frame adapted to be mobile;
   (b) a combustion chamber centrally positioned on said frame, said extreme bottom portion of said combustion chamber being a waste chamber;
   (c) a refuse storage chamber on asid frame having its bottom portion communicating with the lower portion of said combustion chamber, above said waste chamber;
   (d) a grate having movable portions adapted to transfer refuse from said refuse storage chamber to said combustion chamber and unburnable refuse to said waste chamber;
   (e) a hopper mounted on said frame for receiving refuse;
   (f) a passage connecting said hopper to the upper portion of said refuse storage chamber;
   (g) a door pivotally mounted between said passage and said refuse storage chamber, said door normally closed to seal said refuse storage chambers from said passage;
   (h) a rotary lift panel between said hopper and said passage, said rotary lift panel rotatably mounted on a hollow shaft;
   (i) a second shaft within said hollow shaft having means at each end to engage a track parallel to said passage;
   (j) first power means to rotate said hollow shaft and said rotary lift panel scooping refuse from said hopper into said passage;
   (k) second power means to rotate said second shaft and move said rotary lift panel and refuse in said passage opposite the upper portion of said storage chamber and to return said rotary lift panel to the hopper-end of said passage;
   (l) a push panel pivotally mounted to move with said door and positioned in said passage to push said refuse from said rotary lift panel into said refuse storage chamber as said door opens, said door opening when said rotary lift panel is positioned opposite the upper end of said storage chamber;
   (m) a plenum chamber surrounding said combustion chamber;
   (n) at least one burner positioned to direct flame into said combustion chamber in the proximity of said grate;
   (o) means for supplying air to said plenum chamber, said at least one burner, and through said grate into said combustion chamber;
   (p) a plurality of air nozzles communicating from said plenum chamber to said combustion chamber, said air nozzles spaced around the walls of said combustion chamber and positioned to direct air in a circular pattern within said combustion chamber;
   (q) a plurality of louvered slots in the wall of said combustion chamber, said slots communicating between said plenum chamber and said combustion chamber, said louvers being arranged to direct air into said combustion chamber in the same circular pattern as said air nozzles;
   (r) a flue communicating with an opening in said combustion chamber for allowing combustion gases to escape from said combustion chamber;
   (s) a grid cage covering said flue opening and extending into said combustion chamber, said grid cage entrapping large particles of refuse while allowing smaller ash particles and flue gases to escape;
   (t) a plurality of cyclones positioned to receive the combustion gases from said flue for separating the ash particles from said combustion gases, said plurality of cyclones each having a deflector cap at the upper portion to deflect said combustion gases horizontally and an opening at the bottom portion communicating with an ash chamber; and
   (u) at least one blower positioned to direct cooling air over the external surface of said cyclones and subsequently mix with the combustion gases discharging from said cyclones thereby reducing the temperature of the total discharged gases.

2. A mobile apparatus for the collection and incineration of refuse, comprising:
   (a) a frame;
   (b) a combustion chamber mounted on said frame;
   (c) a grate positioned in said combustion chamber said grate being constructed to move refuse through said combustion chamber;
   (d) means mounted on said frame for receiving refuse and transferring said refuse onto said grate;
   (e) at least one oil burner positioned in said combustion chamber to direct flame onto said refuse;
   (f) a plenum chamber surrounding said combustion chamber;
   (g) a plurality of louvers in the walls of said combustion chamber, said louvers providing communication from said plenum chamber to said combustion chamber;
   (h) means for supplying air at superatmospheric pressure to said plenum chamber through said louvers and directionally along the inner surface of said combustion chamber whereby said air cools the combustion chamber wall and subsequently provides oxygen to burn the refuse;
   (i) a flue passage communicating with said combustion chamber;
   (j) a grid for preventing unburned refuse from escaping into said flue including a cylindrically arranged plurality of spaced tubes surrounding said flue and extending into said combustion chamber, said tubes communicating with said plenum chamber whereby air from said plenum chamber cools said tubes by passing through said tubes to said combustion chamber;
   (k) a plurality of cyclones positioned in said flue passage for separating entrained ash particles from the flue gases; and
   (l) blower means positioned to direct cooling air onto the exterior surface of said cyclones, said cooling air subsequently mixing with and thereby cooling the flue gases.

3. A mobile apparatus for the collection and incineration of refuse, comprising:
   (a) a frame;
   (b) a combustion chamber mounted on said frame;
   (c) a grate positioned in said combustion chamber said grate being constructed to move refuse through said combustion chamber;
   (d) means mounted on said frame for receiving refuse and transferring said refuse onto said grate;
   (e) means for supplying sufficient heat to cause combustion of said refuse within said combustion chamber;
   (f) a plenum chamber surrounding said combustion chamber;
   (g) a plurality of louvers in the walls of said combustion chamber, said louvers providing communication from said plenum chamber to said combustion chamber;

(h) means for supplying air at superatmospheric pressure to said plenum chamber through said louvers and directionally along the inner surface of said combustion chamber whereby said air cools the combustion chamber wall and subsequently provides oxygen to burn the refuse;

(i) a flue passage communicating with said combustion chamber;

(j) means including heat exchanger means for preventing unburned refuse from escaping into said flue; and (k) separating means positioned in said flue passage for separating entrained ash particles from the flue gases.

References Cited

UNITED STATES PATENTS

| | | | |
|---|---|---|---|
| 1,183,462 | 5/1916 | Hunter | 110—18 |
| 1,544,323 | 6/1925 | Kener | 110—18 |
| 1,693,400 | 11/1928 | Nygaard | 110—75 |
| 2,701,536 | 2/1955 | Miller | 110—8 |
| 2,702,013 | 2/1955 | Atteberry | 110—18 |
| 2,719,497 | 10/1955 | Hock | 110—18 |
| 2,880,682 | 4/1959 | Peterson et al. | 110—18 |
| 2,936,724 | 5/1960 | Bishop | 110—18 |
| 2,978,997 | 4/1961 | Pierce | 110—18 |
| 2,985,120 | 5/1961 | Brandt et al. | 110—8 |
| 3,031,981 | 5/1962 | Smouder | 110—8 |

KENNETH W. SPRAGUE, *Primary Examiner.*